United States Patent
Ruelle

(10) Patent No.: US 12,045,175 B2
(45) Date of Patent: Jul. 23, 2024

(54) PREVENTING A PROCESSOR FROM RE-EXECUTING INSTRUCTIONS

(71) Applicant: STMicroelectronics (Grand Ouest) SAS, Le Mans (FR)

(72) Inventor: Frederic Ruelle, Marigné-Laillé (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 159 days.

(21) Appl. No.: 17/457,569

(22) Filed: Dec. 3, 2021

(65) Prior Publication Data

US 2022/0197828 A1   Jun. 23, 2022

(30) Foreign Application Priority Data

Dec. 17, 2020 (FR) ..................... 2013505

(51) Int. Cl.
*G06F 12/14* (2006.01)
*G06F 21/54* (2013.01)
*G06F 21/55* (2013.01)
*G06F 21/78* (2013.01)

(52) U.S. Cl.
CPC ...... *G06F 12/1441* (2013.01); *G06F 12/1458* (2013.01); *G06F 21/54* (2013.01); *G06F 21/556* (2013.01); *G06F 21/78* (2013.01)

(58) Field of Classification Search
CPC ............. G06F 12/1433; G06F 12/1441; G06F 12/1458; G06F 21/54; G06F 21/556; G06F 21/565; G06F 21/71; G06F 21/78; G06F 2212/1052

See application file for complete search history.

(56) References Cited

U.S. PATENT DOCUMENTS

| | | | |
|---|---|---|---|
| 8,141,145 B2 * | 3/2012 | Gogniat ................. | G06F 11/28 726/17 |
| 9,430,409 B2 * | 8/2016 | Berntsen ................. | G06F 21/77 |
| 9,749,141 B2 | 8/2017 | Keidar et al. | |
| 2002/0051538 A1 * | 5/2002 | Kaplan ............... | G06F 12/1491 380/59 |
| 2003/0233565 A1 | 12/2003 | Kim | |
| 2004/0158742 A1 | 8/2004 | Srinivasan et al. | |

(Continued)

FOREIGN PATENT DOCUMENTS

JP    3603895 B2 * 12/2004

*Primary Examiner* — Theodore C Parsons
(74) *Attorney, Agent, or Firm* — Slater Matsil, LLP

(57) ABSTRACT

A system includes a processing unit, a memory configured to store at least one first group of instructions and one second group of instructions for execution by the processing unit, the processing unit being configured to sequentially extract from the memory instructions of the first group and instructions of the second group for their execution. The system also includes a controller including a first auxiliary memory configured to store a protection criterion, a comparator configured to compare the storage address of each extracted instruction with the protection criterion, and a control circuit configured to, in response to the storage address meeting the protection criterion, trigger a protection mechanism including at least one prohibition for the processing unit to execute again at least one portion of the instructions of the first group, during the execution of the instructions of the second group.

34 Claims, 6 Drawing Sheets

(56) References Cited

U.S. PATENT DOCUMENTS

| | | | |
|---|---|---|---|
| 2005/0257016 A1* | 11/2005 | Boles | G06F 12/1491 |
| | | | 711/163 |
| 2008/0120517 A1* | 5/2008 | Gogniat | G06F 11/28 |
| | | | 714/E11.178 |
| 2014/0006692 A1* | 1/2014 | Berntsen | G06F 21/77 |
| | | | 711/103 |
| 2019/0179774 A1* | 6/2019 | Hershman | G11C 29/08 |
| 2019/0236281 A1 | 8/2019 | Hershman et al. | |

* cited by examiner

PREVENTING A PROCESSOR FROM RE-EXECUTING INSTRUCTIONS

CROSS-REFERENCE TO RELATED APPLICATIONS

This application claims the benefit of French Patent Application No. 2013505, filed on Dec. 17, 2020, which application is hereby incorporated herein by reference.

TECHNICAL FIELD

Implementations and embodiments relate to electronic systems such as microcontrollers, particularly those including a memory, and more particularly, the protection of these systems, in particular the protection of boot instructions, or initialization instructions, of the system.

BACKGROUND

The security of electronic systems is all the more important as the fields of connected objects, for example home automation, develop. In particular, it is important to be able to make sure that the boot instructions contained in a memory and executed during the initialization of the system correspond well to the desired instructions and not to instructions modified by ill-intentioned third parties.

Indeed, secure boot instructions make it possible to guarantee a chain of trust established and maintained throughout the execution of software instructions on the product.

In addition, secure boot instructions are used as root of trust by using cryptographic functions to confirm the authenticity and the integrity of the application program of the user before making it possible to execute this application program. Consequently, there is a need to improve the protection of electronic systems such as microcontrollers, and in particular the security of boot instructions, particularly but not exclusively when they are incorporated within connected objects.

SUMMARY

According to one implementation and embodiment, it is proposed to make the boot instructions of the microcontroller, or of at least one portion of these instructions corresponding to the most critical services, unavailable as soon as the application program is booted so as to prevent as far as possible a malicious software from reusing the coded services in the boot instructions in an unauthorized way in the aim of jeopardizing the overall security of the product, for example a connected object, incorporating such a microcontroller.

According to one aspect, a method for protecting a system, for example a microcontroller, is proposed.

This system comprises a processing unit, for example a processor core, and a memory storing at least one first group of instructions, for example boot instructions, and a second group of instructions, for example an application program, that can be executed by the processing unit.

The method comprises a sequential extraction from the memory, of the instructions of the first group and of the instructions of the second group by the processing unit for their execution.

In addition, the method comprises a comparison of the storage address of each extracted instruction with a protection criterion.

In addition, if this storage address meets the protection criterion, the method provides a triggering of a protection mechanism including at least one prohibition for the processing unit to execute again at least one portion of the instructions of the first group, during the execution of the instructions of the second group.

The system may comprise a communication bus and at least one master equipment, such as a direct memory access (DMA) circuit: connected on the bus, and the protection mechanism then also advantageously includes a prohibition for the at least one master equipment to access at least one portion of the instructions of the first group, during the execution of the instructions of the second group.

Thus, the protection criterion is advantageously a criterion aiming to protect at least one portion of the first group of instructions.

So long as this protection criterion is not met, the instructions of the first group, that is to say for example the boot instructions, may execute normally. But, as soon as an instruction extracted from the memory meets the protection criterion, then, for the application program or any other sequence initiated by a master equipment on the bus, and during its execution, the access is locked to at least one portion of the boot instructions, optionally to the set of boot instructions and also optionally to certain sensitive data stored in memory.

In addition, the comparison between the address of an extracted instruction with the protection criterion is advantageously carried out automatically. Similarly, this triggering of the protection mechanism is carried out advantageously automatically as soon as the protection criterion is met by implementing for example a hardware circuit, including for example a hardwired logic, without it being necessary to use specific logic instructions.

A plurality of solutions is possible for defining the protection criterion which, when it will be met, will make it possible to trigger the protection mechanism.

Thus, the protection criterion may be the address of the first instruction of the second group of instructions or the address of the last instruction of the first group of instructions. In this case, an instruction extracted from the memory meets the protection criterion if its address is the address of the first instruction of the second group of instructions or the address of the last instruction of the first group of instructions.

Alternatively, the protection criterion may comprise a first address range and, in this case, an instruction meets the protection criterion if its address is located outside of this first address range.

This first address range is for example the address range of the instructions of the first group of instructions.

According to one implementation, the protection mechanism may include at least one prohibition for the processing unit to execute again, not one portion but all of the instructions of the first group and/or a prohibition for the at least one master equipment to access not one portion but all of the instructions of the first group, during the execution of the instructions of the second group.

In other terms, in this implementation, the access to all of the boot instructions that is to say all of the services contained in these boot instructions is locked.

As previously indicated, the protection mechanism includes at least one prohibition for the processing unit to execute again at least one portion of the instructions of the first group of instructions and/or a prohibition for the at least one master equipment to access at least one portion of the instructions of the first group, during the execution of the instructions of the second group.

In addition, according to one implementation, this prohibition of the new execution by the processing unit of an instruction of the portion or of the access by the at least one master equipment to an instruction of the portion comprises a detection of a new request to extract this instruction from memory issued by the processing unit or by the at least one master equipment and the performance of an action preventing the new request to extract this instruction from being served.

In other terms, whereas to determine if the protection criterion is or is not met, the address of an instruction extracted from the memory is observed, this time, to prohibit the new execution of an instruction by the processing unit or to prohibit an access to an instruction by a master equipment, the request to extract this instruction (that is to say before this instruction is extracted from the memory) is observed, and an action will then be performed preventing this new extraction request from being served that is to say an action aiming to prevent this newly requested instruction from being extracted from the memory.

This contributes to improving the security of the instructions of the first group, that is to say of the boot instructions for example.

By way of example, the performance of this action may comprise a reset of the system.

Alternatively, the performance of this action may comprise the delivery to the processing unit or to the at least one master equipment of a reference instruction instead of the requested instruction.

This reference instruction may be for example but not limited to, a No Operation (NOP) instruction known by the person skilled in the art.

According to one implementation, the at least one portion of the instructions of the first group concerned by the protection mechanism may be stored at storage addresses belonging to at least one second address range. In this case, the detection of the new request to extract an instruction comprises a comparison between the address of this requested instruction and the at least one second address range.

This second address range may be the address range of the set of instructions of the first group if it is desired to prohibit an access to all of the instructions of the first group or an address range more restricted than the address range of the instructions of the first group if it is desired to prohibit only certain coded services in the boot instructions and to authorize the access to other services by the application program contained in the boot instructions, such as for example the access to the version number of this boot program.

As previously indicated, it is also possible, according to one implementation, that the protection mechanism also includes a prohibition for the processing unit and/or for the at least one master equipment to access, during the execution of the second group of instructions, at least one data stored in the memory, and generally a plurality of data stored in the memory.

This or these data that it is desired to protect may be stored in the same memory as that storing the instructions of the first group or in a different memory, for example a static random access memory (SRAM).

These data may be data handled by the boot instructions. In general, these data are erased by the boot instructions when they are stored in a random access memory, but if this is not the case, the protection mechanism makes it possible to ensure no access to these data that may be sensitive.

In this case, according to one implementation, the prohibition to access the data comprises a detection of a request to extract this data from the memory issued by the processing unit or by the at least one master equipment and the performance of an action preventing this new request to extract this data from being served.

Again, the performance of this action may comprise a performance of the system or then the delivery to the processing unit or to the at least one master equipment of a reference data, for example a zero data, instead of the requested data.

According to one implementation, the at least one data concerned by the protection mechanism is stored at a storage address belonging to at least one third address range and in this case, the detection of the request to extract a data comprises a comparison between the address of this requested data and the at least one third address range.

According to another aspect, a system is proposed, comprising:
- a processing unit,
- a memory intended to store at least one first group of instructions and one second group of instructions that can be executed by the processing unit, the processing unit being configured to sequentially extract from the memory, instructions of the first group and instructions of the second group for their execution, and
- a controller including a first auxiliary memory intended to store a protection criterion, a comparator configured to compare, advantageously automatically, the storage address of each extracted instruction with the protection criterion, and a control circuit configured to, if this storage address meets the protection criterion, trigger, advantageously automatically, a protection mechanism including at least one prohibition for the processing unit to execute again at least one portion of the instructions of the first group, during the execution of the instructions of the second group.

According to one embodiment, the system comprises a communication bus and also at least one master equipment connected on the bus, and the protection mechanism also includes a prohibition for the at least one master equipment to access at least one portion of the instructions of the first group, during the execution of the instructions of the second group.

According to one embodiment, the protection criterion is the address of the first instruction of the second group of instructions or the address of the last instruction of the first group of instructions, and an instruction meets the protection criterion if its address is the address of the first instruction of the second group of instructions or the address of the last instruction of the first group of instructions.

According to one embodiment, the protection criterion comprises a first address range and an instruction meets the protection criterion if its address is outside of the first address range.

According to one embodiment, the first address range is the address range of the instructions of the first group.

According to one embodiment, the control circuit is configured to at least prohibit the processing unit from executing again all of the instructions of the first group and/or to at least prohibit the at least one master equipment from accessing all of the instructions of the first group, during the execution of the instructions of the second group, during the execution of the instructions of the second group.

According to one embodiment, in order to prohibit the new execution by the processing unit of an instruction of the portion or the access by the at least one master equipment to an instruction of the portion of an instruction of the portion, the control circuit is configured to detect a new request to extract this instruction from the memory issued by the processing unit or by the at least one master equipment and to perform an action preventing the new request to extract this instruction from being served.

According to one embodiment, the control circuit is configured to carry out the performance of the action by resetting the system.

According to one embodiment, the control circuit is configured to carry out the performance of the action by delivering to the processing unit or to the at least one master equipment, a reference instruction instead of the requested instruction.

According to one embodiment, the at least one portion of the instructions of the first group concerned by the protection mechanism are stored at storage addresses belonging to at least one second address range, the control circuit comprises a second auxiliary memory intended to store the at least one second address range and the control circuit is configured to carry out the detection of the new request to extract an instruction by comparing the address of this requested instruction with the at least one second address range.

According to one embodiment, the protection mechanism also includes a prohibition for the processing unit and/or the at least one master equipment, to access, during the execution of the second group of instructions, at least one data stored in the memory.

According to one embodiment, in order to implement the access prohibition, the control circuit is configured to detect a request to extract this data from the memory issued by the processing unit or the at least one master equipment and to perform an action preventing the new request to extract this data from being served.

According to one embodiment, the control circuit is configured to carry out the performance of the action by resetting the system.

According to one embodiment, the control circuit is configured to carry out the performance of the action by delivering to the processing unit or to the at least one master equipment, a reference data instead of the requested data.

According to one embodiment, the at least one data concerned by the protection mechanism is stored at a storage address belonging to at least one third address range, the control circuit comprises a third auxiliary memory intended to store the at least one third address range and the control circuit is configured to detect the request to extract a data by comparing the address of this requested data with the at least one third address range.

According to one embodiment, the protection criterion and the second and third address ranges are stored in a protected manner.

According to one embodiment, the system is a microcontroller, the first group of instructions comprises boot instructions and the second group of instructions comprises instructions of an application program.

According to another aspect, a connected object incorporating a system such as defined above is proposed.

BRIEF DESCRIPTION OF THE DRAWINGS

Other advantages and features of the invention will become apparent upon examination of the detailed description of non-limiting implementations and embodiments, and of the appended drawings, wherein.

DETAILED DESCRIPTION OF ILLUSTRATIVE EMBODIMENTS

Figure 1:
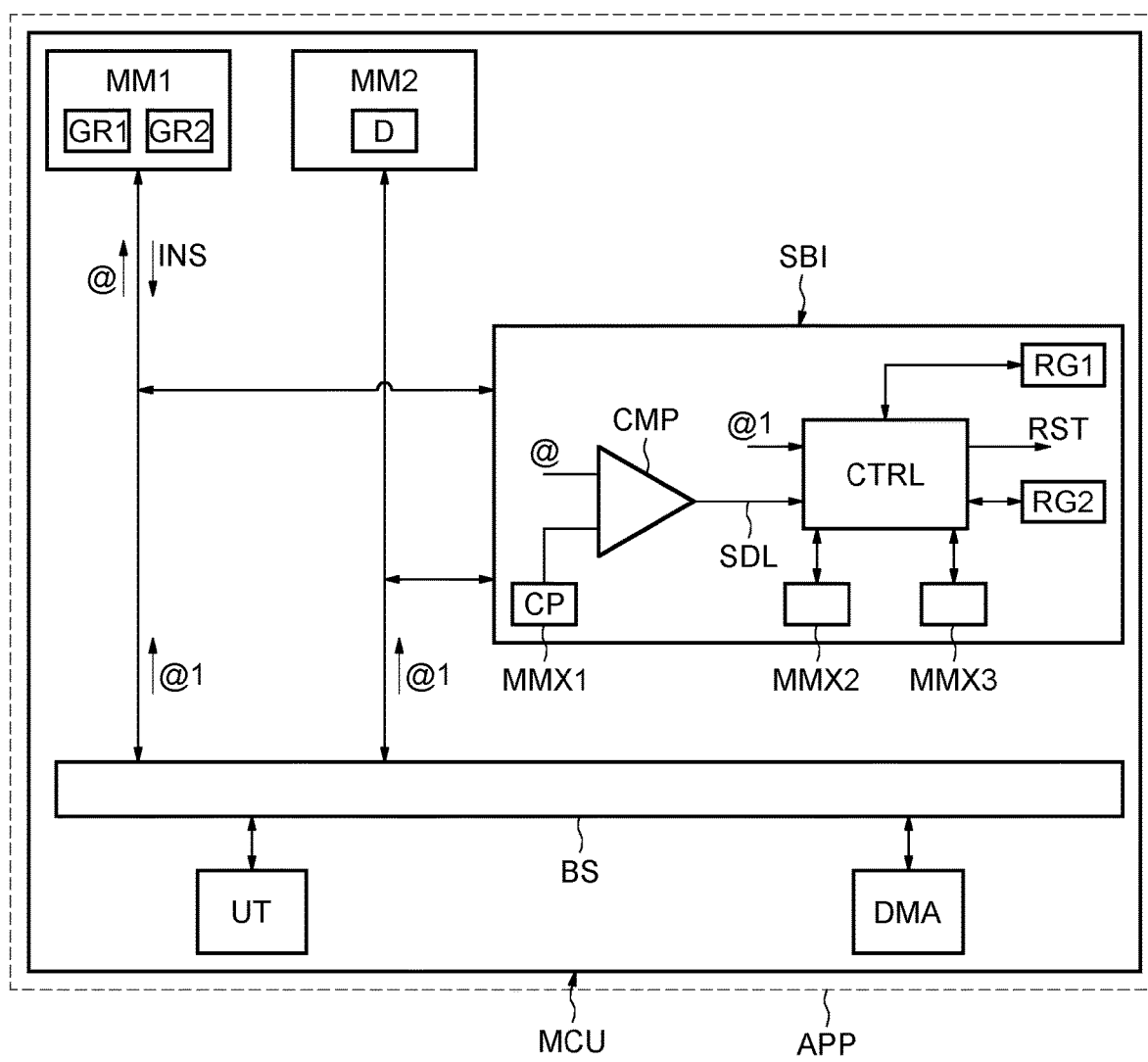
FIG. 1 illustrates a system, for example a microcontroller, incorporated within an apparatus, for example a connected object.

In FIG. 1, the reference MCU designates a system, for example a microcontroller, incorporated here within an apparatus APP, for example a connected object.

The microcontroller MCU is a microcontroller whereof it is sought to protect instructions, for example the boot instructions in particular against modifications or illicit access that is to say carried out outside of the execution context of the boot program.

The microcontroller MCU includes a processing unit UT, for example a processor core, and a memory including in this example a first memory MM1 and a second memory MM2.

The first memory MM1 may be a rewritable non-volatile memory, for example a FLASH memory. The second memory MM2 may be a volatile memory for example a static random access memory (SRAM).

The microcontroller MCU also includes other elements, for example a direct memory access DMA circuit and peripherals not shown here for the purposes of simplification of the figure. Some of these elements may be master elements and others slave resources.

The various elements of the microcontroller are connected to one another in particular by a communication bus BS that generally includes an instruction bus, a data bus and a system bus. These buses are for example of the AMBA (Advanced Microcontroller Bus Architecture) type.

The instruction bus and the data bus each particularly comprise an address thread for the transmission of addresses and a data thread for the transmission of instructions (if this concerns the instruction bus) or of data (if this concerns the data bus).

The processing unit UT may thus extract instructions for their execution or data located in the memories MM1 and/or MM2.

In this example, the memory MM1 stores in particular a first group GR1 of instructions, typically boot instructions, or initialization instructions, of the system and a second group GR2 of instructions, typically instructions of an application program.

In this example, it is assumed that the memory MM2 also stores data D that as will be seen below are data to be protected.

Of course, some at least of the data to be protected may also be stored in the memory MM1.

Boot instructions means the instructions themselves and optionally data necessary for the execution of the instructions. The boot instructions are executed by the processing unit UT. The boot instructions are preferably from the first instructions executed during the start of operation of the system.

The boot instructions include for example the parameters for initializing one or more elements of the microcontroller such as for example a protection unit of the memory that authorizes or not the access of various memory portions to various peripherals and to various programs, a "watch dog" type circuit and non-volatile protection circuits.

The boot instructions are written in the memory MM1 during the initial programming of the system. The boot instructions are not meant to be modified outside of a total reprogramming of the system that would imply the total erasure of the memory MM1.

This reprogramming will then be considered as the new initial programming of the system. Thus, modifications of boot instructions imply a hacking attempt seeking for example to bypass the security mechanisms of the microcontroller MCU and/or to have access to unauthorized services.

The instructions of the second group GR2, typically the instructions of the application program, are executed after the execution of the first group of instructions, particularly if the boot program has verified the authenticity and the integrity of this second group of instructions.

The microcontroller MCU also includes a controller SBI configured, as will be seen in more detail below, to ensure a protection of at least one portion of the instructions of the first group GR1, optionally of all of these instructions, and optionally of the data D, during the execution of the application program.

As will be seen in more detail below, this protection mechanism includes in this example, a prohibition for the processing unit UT to execute again at least one portion or all of the instructions of the first group GR1 during the execution of the instructions of the second group GR2 and to access the sensitive data D contained in the memory MM2 during the execution of the instructions of the second group.

However, the protection mechanism also advantageously includes a prohibition for each master equipment, in particular the DMA circuit, to access at least one portion or all of the instructions of the first group GR1 (for example not to execute an instruction but to copy it) during the execution of the instructions of the second group GR2 and to access the sensitive data D contained in the memory MM2 and/or in the memory MM1, during the execution of the instructions of the second group.

In the interest of simplification, it will only be described below the protection mechanism applicable to the processing unit, bearing in mind that it applies identically to each master equipment.

When the processing unit UT desires to extract an instruction from the memory MM1, it transmits the address @ of this instruction on the instruction thread of the instruction bus and receives the corresponding instruction INS on the data thread of the instruction bus.

Similarly, when the processing unit desires to access a data contained in the memory MM2, it issues an access (or extraction) request by transmitting the address of this data on the address thread of the data bus and receives the data on the data thread for the data bus.

The controller SBI includes a comparator CMP configured to compare the address @ of an instruction INS extracted from the memory MM1 with a protection criterion CP contained in first auxiliary memory MMX1, for example one or more registers.

We will come back in more detail below on the content of this protection criterion CP.

If the address @ of the extracted instruction INS meets the protection criterion CP, then the comparator CMP is configured to deliver a trigger signal SDL to a control circuit CTRL that will implement the protection mechanism that will be described in more detail below.

But it may now be indicated that this protection mechanism implemented by the control circuit CTRL provides the comparison of the address @1 contained in a request for extracting an instruction or in a request to access a data with the content of second auxiliary memory MMX2 or of third auxiliary memory MMX3 whereof we will come back on the contents in more detail below.

In addition, in the event of attempt of prohibited access either to an instruction or to a data, the control circuit CTRL is configured to perform an action prohibiting the processing unit either from executing again the requested instruction or from accessing the requested data.

In this regard, as will be seen in more detail below, this action may consist of resetting the microcontroller MCU by delivering the reset signal RST on the reset pin of the microcontroller either by delivering a reference instruction, for example an instruction of the "No Operation" type, contained in a register RG1 instead of the requested instruction, or by delivering a reference data, for example a zero data, contained in the second register RG2 instead of the requested data.

It should also be noted that the controller SBI is only hardware. In particular the control circuit CTRL comprises a hardwired logic.

According to this hardware aspect of the controller SBI, the controller SBI automatically verifies whether or not the protection criterion is met, to automatically trigger if applicable the protection mechanism and automatically execute it.

Figure 2:
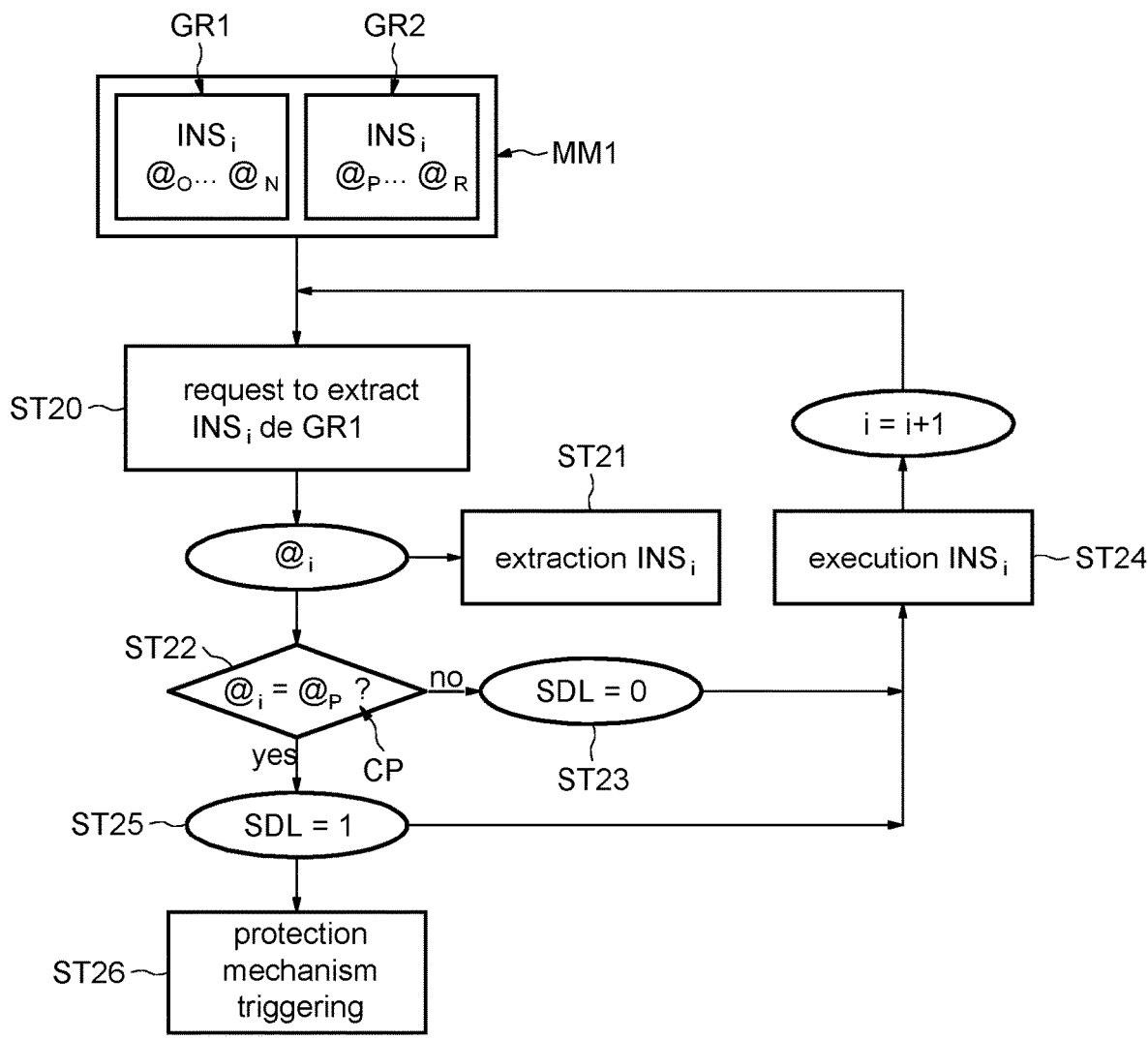
FIG. 2 illustrates operation of a protection mechanism where the protection criterion is the first address of the application program.

Reference is now made to FIG. 2 and following to describe implementations of the protection method according to the invention.

In this example, as illustrated in FIG. 2, it is assumed that the instructions INSi of the first group GR1, that is to say the boot instructions, are stored at the address range @0 . . . @N whereas the instructions INSi of the second group GR2 of instructions, that is to say the instructions of the application program, are stored at the address range @P . . . @R.

P may be equal to N+1 but not necessarily.

The processing unit UT will then start to sequentially extract from the memory MM1 the instructions INSi of the first group of instructions GR1.

Thus, as illustrated by step ST20, the request to extract the instruction INSi of the first group GR1 results in the issuance on the instruction bus by the processing unit UT of the address @i of this instruction.

This instruction INSi is extracted from the memory MM1 (step ST21) and moreover, in step ST22, the address @i of this instruction INSi is compared with the address @P that is the address of the first instruction of the application program.

In this example of implementation, this address @P forms the protection criterion CP mentioned above.

If the address @i is not equal to the address @P, then the trigger signal SDL takes a first logic value, for example the value 0 (step ST23) and the protection mechanism is not triggered. Moreover, the instruction INSi is executed in step ST24 and we go back to step ST2o for the following instruction of the first group of instructions.

Thus, so long as the address of an extracted instruction is not equal to the address @P, that is to say so long as it does not meet the protection criterion CP, everything takes place normally and no protection mechanism is triggered.

However, as soon as the address @i of the extracted instruction INSi is equal to the address @P, then the trigger signal SDL takes the logic value 1 (step ST25) which triggers in step ST26 the protection mechanism. Moreover, this instruction is executed in step ST24.

At this moment, which corresponds to the start of the execution of the application program, the processing unit will continue to issue requests to extract instructions INSi of the second group of instructions so as to sequentially extract them and execute the application program. If no hacking attempt took place, everything takes place normally and the protection mechanism, although activated, will not issue a specific protection action.

If, however, following a hacking of the application program for example, the processing unit tries, during the execution of the application program, to extract an instruction INSi from the first group of instructions when this is not permitted, a specific protection action will be delivered by the protection mechanism as will be explained in more detail below.

Figure 3:
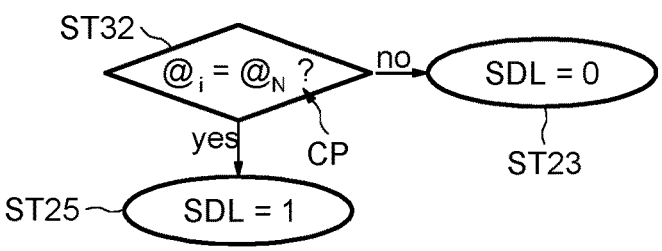
FIG. 3 illustrates operation of the protection mechanism where the protection criterion is the last address of the boot instruction program.

Whereas in the example of FIG. 2, the protection criterion CP is the first address @P of the application program (2nd group GR2 of instructions) it is possible, as illustrated in FIG. 3, that the protection criterion CP is the last address @N of the first group of instructions GR1 that is to say the last address of the boot instruction program.

In this case, so long as the address @i of an extracted instruction is not equal to this last address @N, we go to step ST23 explained above. In addition, as soon as this address @i is equal to the last address @N, then we go to step ST25 mentioned above.

Figure 4:
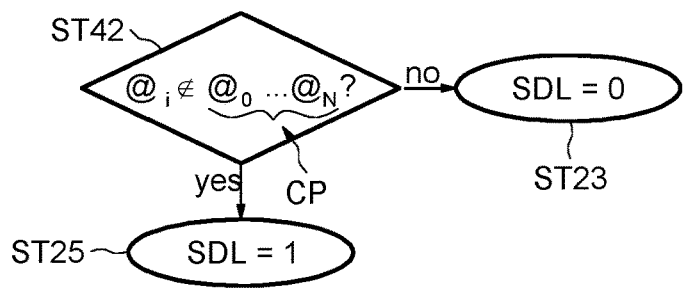
FIG. 4 illustrates operation of the protection mechanism where the protection criterion is an address range of the boot instruction program.

It would also be possible, as illustrated in FIG. 4, that the protection criterion CP is the address range @0 . . . @N of the instructions of the first group GR1.

In this case, so long as the address @i of an extracted instruction belongs to this address range @0 . . . @N, we go to step ST23 (no triggering of the protection mechanism).

However, as soon as the address @i does not belong to (is outside of) the range @0 . . . @N, then we go to step ST25 by triggering the protection mechanism.

This implementation offers more reinforced security in relation to the implementation of FIGS. 2 and 3. Indeed, in the implementation of FIG. 2 for example, an ill-intentioned third parry may modify the software so that the processing unit never extracts the first address of the application program which would not trigger the protection mechanism. The application program would then perhaps run erroneously, but this could perhaps allow a third party to access certain information contained in the boot program.

However, this is no longer possible in the implementation of FIG. 4 because all of the addresses of the instructions of the application program are outside of the address range @0 . . . @N of the boot program. Consequently, at least one extraction of one of the instructions of the application program will trigger the protection mechanism.

Figure 5:
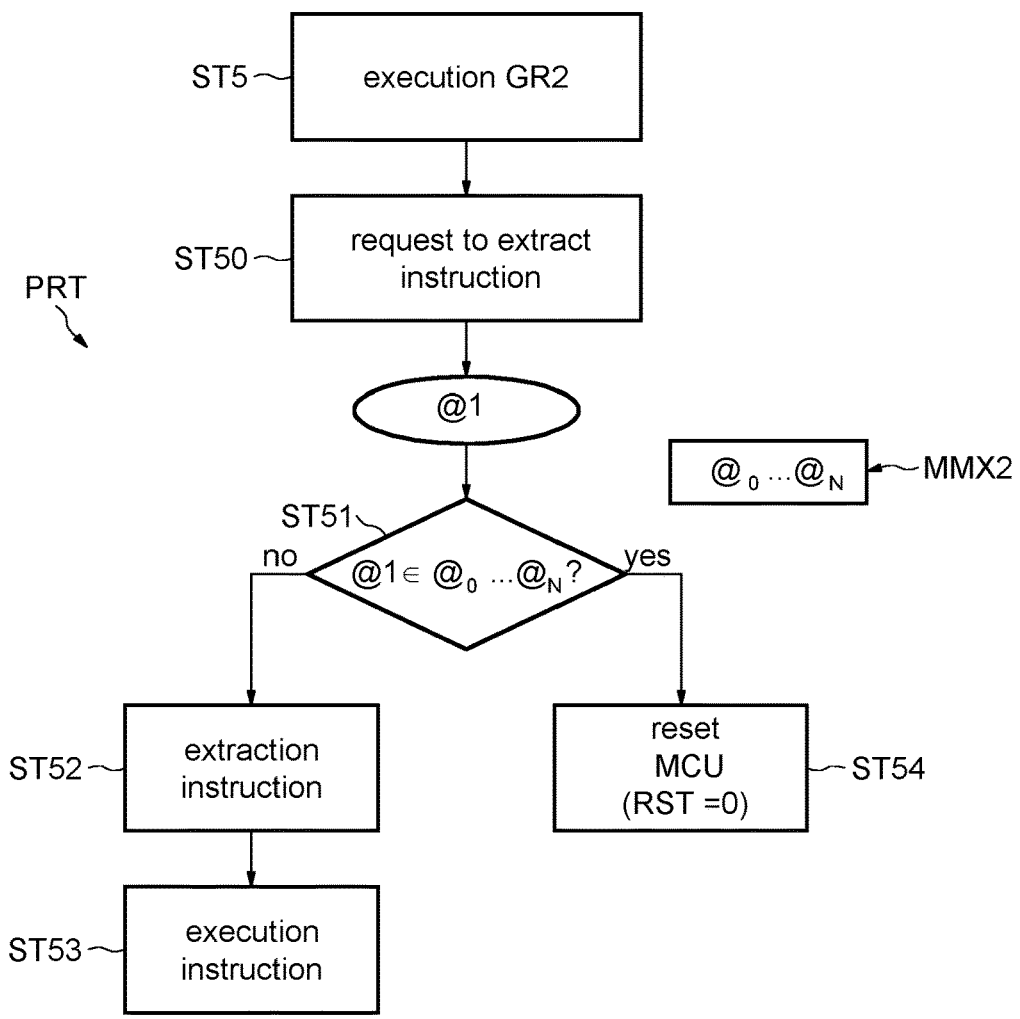
FIG. 5 illustrates execution of the application program instructions by the processing unit where the control circuit resets the microcontroller.

Reference is now made to FIG. 5 and following to illustrate implementations of the protection mechanism PRT triggered in step ST26 of FIG. 2.

As illustrated in FIG. 5, at this stage, the processing unit UT executes the instructions of the application program (2nd group GR2) (step ST5).

The processing unit UT issues in step ST50 a request to extract an instruction being at the address @1 in the memory MM1.

This address @1 is therefore delivered on the address thread for the instruction bus and is controlled by the control circuit CTRL (FIG. 1).

It is assumed here, in this example, that the second auxiliary memory MMX2 contains the entire address range @0 . . . @N of the boot instructions. In other terms, it is desired to prohibit here a new access to all of the boot program.

In step ST51, the control circuit consequently verifies whether the address @1 does or does not belong to the address range @0 . . . @N.

If this address @1 does not belong to this address range, then the corresponding instruction may be extracted from the memory MM1 (step ST52) then executed (step ST53).

If however in step ST51 it turns out that the address @1 belongs to the address range @0 . . . @N, then the control circuit will prohibit a new execution of this instruction. In this example, this prohibition results in a reset by the control circuit of the microcontroller MCU by setting for example the reset signal RST to zero (step ST54).

Therefore, it can be seen here that the instruction that is the subject of a request by the processing unit is not delivered on the instruction bus.

Figure 6:
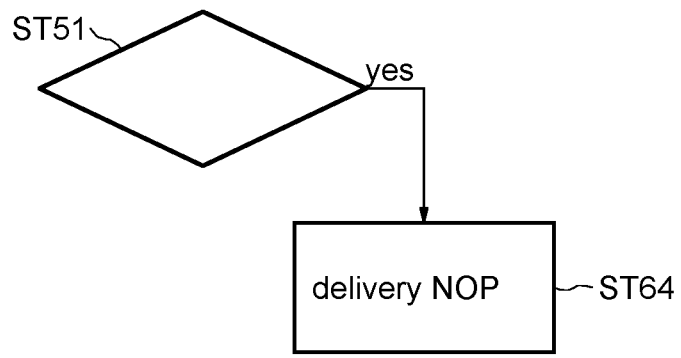
FIG. 6 illustrates the operation of FIG. 5 where the control circuit alternatively delivers a reference instruction to the processing unit.

Alternatively, as illustrated in FIG. 6, it would be possible instead of step ST54 to perform step ST64 wherein the control circuit delivers on the instruction bus to the processing unit the reference instruction, (in this instance the NOP instruction) contained in the register RG1.

Again, the instruction that is stored at the address @1 and that has been requested by the processing unit UT is not delivered to it.

Figure 7:
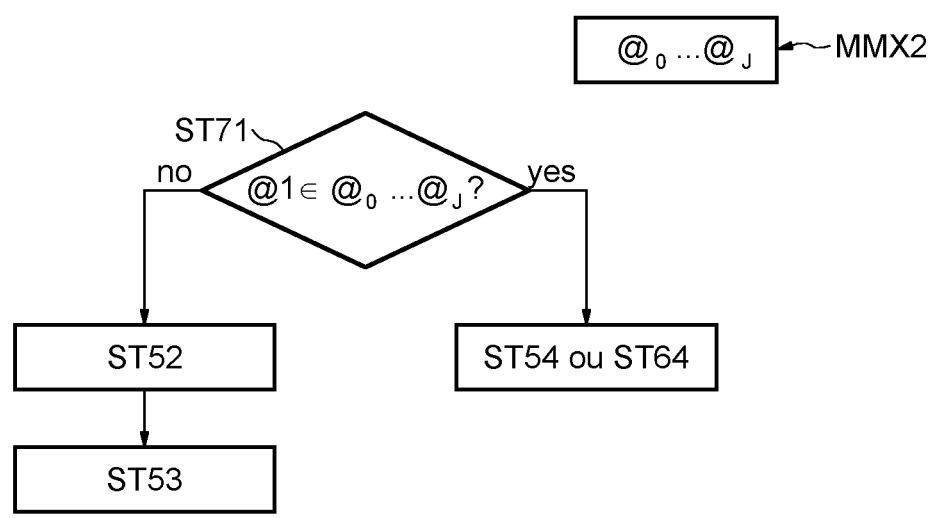
FIG. 7 illustrates protection of only a portion of the instructions of the boot program.

It is possible, as illustrated in FIG. 7, that it is desired to protect only a portion of the instructions of the boot program so as to enable the user to be able to nevertheless access during the execution of the application program, certain coded services in the boot program.

Thus, in this case, as illustrated in FIG. 7, only the address sub-range @0 . . . @J is stored in the second auxiliary memory MMX2.

In addition, in step ST71, the control circuit CTRL verifies whether the address @1 of the instruction requested by the processing unit does or does not belong to the address sub-range @0 . . . @G. If it does not belong to this sub-range, then steps ST52 and ST53 of FIG. 5 are executed.

If however this address @1 is a protected address, that is to say belonging to the sub-range @0 . . . @J, then either step ST54 or step ST64 of FIG. 5 or of FIG. 6 is executed.

Figure 8:
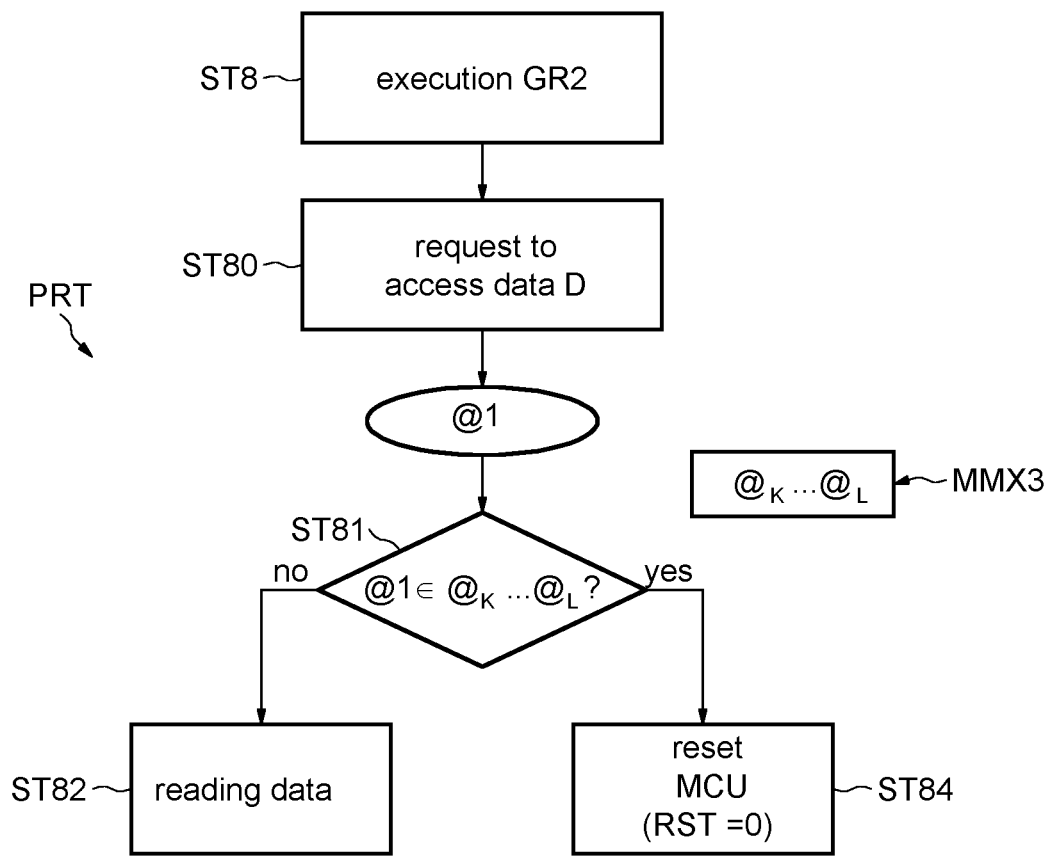
FIG. 8 illustrates the protection mechanism protecting access to the data during the execution of the application program, where the control circuit resets the microcontroller.
Figure 9:
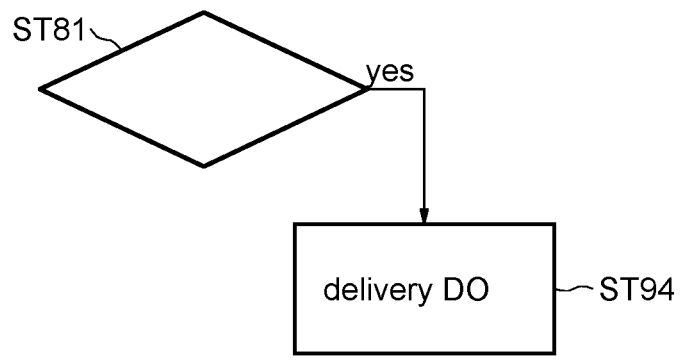
FIG. 9 illustrates the operation of FIG. 8 where the control circuit alternatively delivers a reference instruction to the processing unit.

Reference is now made more particularly to FIGS. 8 and 9 to illustrate one implementation wherein the protection mechanism PRT protects the access to data D during the execution of the application program.

This execution is illustrated by step ST8 of FIG. 8.

It is assumed in this example that the data D to be protected to which it is not desired that the processing unit UT may access during the execution of the application program, are stored at the address range @K . . . @L in the third auxiliary memory MMX3.

When the processing unit UT issues a request to access a data D in step ST80, it delivers on the address thread of the data bus the address @1 of the requested data.

The control circuit then verifies whether this address @1 does or does not belong to the address range stored in the third auxiliary memory MMX3.

If this is not the case, then the requested data is effectively read (step ST82).

If however the address @1 belongs to the data range @K . . . @L, then, again, the reading of this data is prohibited.

In this regard, the control circuit CTRL may as illustrated in step ST84, reset the microcontroller MCU.

Alternatively, as illustrated in FIG. 9, it is possible, in place of resetting the microcontroller MCU, that the control circuit CTRL delivers instead of the requested data D, a reference data D0 contained in the register RG2, for example the zero data (step ST94).

Figure 10:
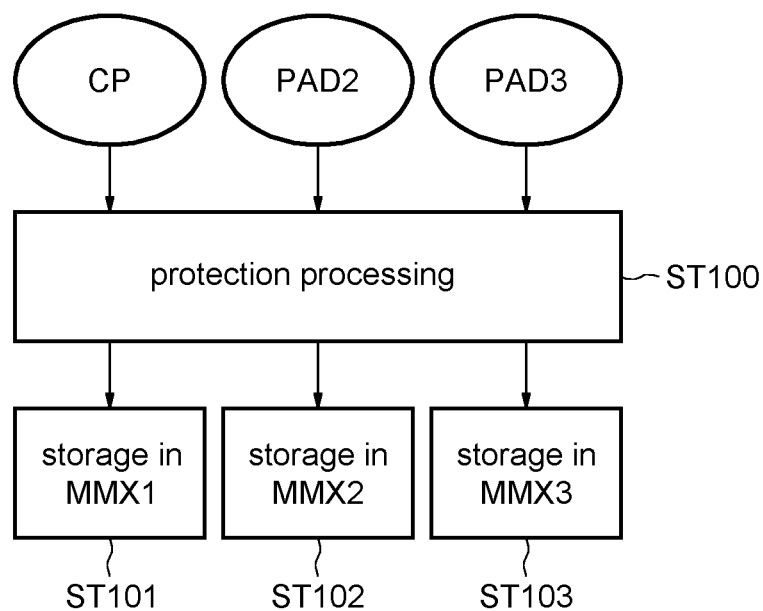
FIG. 10 the application of a protection process to each of protection criterion, first address range, and second address range parameters, where the protection process may be identical or different for each of the parameters.

It was previously seen that the protection criterion CP, an address range PAD2 and an address range PAD3 were respectively stored as such in the auxiliary memory MMX1, MMX2 and MMX3;

So as to improve the security, it is possible, as illustrated in FIG. 10, to apply to each of these parameters CP, PAD2 and PAD3 a protection process ST100 that may be identical or different for each of the parameters.

Such a protection process may comprise for example a process of scrambling bits of these parameters or indeed a process including the addition of a control word of the CRC ("checksum") type to the various parameters, or also a cryptography process, or indeed a combination of some at least of these processes.

These protected parameters are then respectively stored in the first auxiliary memory MMX1 (step ST101), in the second auxiliary memory MMX2 (step ST102) and in the third auxiliary memory (step ST103).

Of course, during the reading of the auxiliary memories, the control circuit will apply the reverse protection process to find the original parameters.

What is claimed is:

1. A method for protecting a system, the system comprising a processing unit and a memory storing at least one first group of instructions and one second group of instructions executable by the processing unit, the method comprising:
    sequentially extracting, by the processing unit from the memory, the instructions of the first group and the instructions of the second group for execution;
    comparing a storage address of each extracted instruction with a protection criterion; and
    in response to the compared storage address meeting the protection criterion, triggering a protection mechanism including at least one prohibition for the processing unit to execute again at least one portion of the instructions of the first group, during the execution of the instructions of the second group.

2. The method according to claim 1, wherein the system further comprises a communication bus and at least one master equipment connected on the bus, and the protection mechanism further includes a prohibition for the at least one master equipment to access the at least one portion of the instructions of the first group, during the execution of the instructions of the second group.

3. The method according to claim 1, wherein the protection criterion is an address of a first instruction of the second group of instructions or an address of a last instruction of the first group of instructions, and a protected instruction meets the protection criterion when its address is the address of the first instruction of the second group of instructions or the address of the last instruction of the first group of instructions, respectively.

4. The method according to claim 2, wherein the protection criterion comprises a first address range and a protected instruction meets the protection criterion when its address is outside of the first address range.

5. The method according to claim 4, wherein the first address range is an address range of the instructions of the first group.

6. The method according to claim 4, wherein the protection mechanism includes at least one prohibition for the processing unit to execute again all of the instructions of the first group, during the execution of the instructions of the second group, or a prohibition for the at least one master equipment to access all of the instructions of the first group, during the execution of the instructions of the second group.

7. The method according to claim 2, wherein the prohibition of the execution again by the processing unit of a protected instruction of the portion or of the access by the at least one master equipment to the protected instruction of the portion, comprises:
    detecting a new request to extract the protected instruction from the memory issued by the processing unit or by the at least one master equipment; and
    performing an action preventing the new request to extract the protected instruction from being served.

8. The method according to claim 7, wherein performing the action comprises resetting the system.

9. The method according to claim 7, wherein performing the action comprises delivering, to the processing unit or to the at least one master equipment, a reference instruction instead of the protected instruction.

10. The method according to claim 7, wherein the at least one portion of the instructions of the first group protected by the protection mechanism is stored at storage addresses belonging to at least one second address range, and the detecting the new request to extract the protected instruction comprises comparing an address of the protected instruction and the at least one second address range.

11. The method according to claim 2, wherein the protection mechanism further includes prohibiting access, for the processing unit or for the at least one master equipment, during the execution of the second group of instructions, of at least one protected data stored in the memory.

12. The method according to claim 11, wherein the prohibiting access comprises:
    detecting a new request to extract the protected data from the memory issued by the processing unit or by the at least one master equipment; and
    performing an action preventing the new request to extract the protected data from being served.

13. The method according to claim 12, wherein the performing the action comprises resetting the system.

14. The method according to claim 12, wherein the performing the action comprises delivering, to the processing unit or to the at least one master equipment, a reference data instead of the protected data.

15. The method according to claim 12, wherein the at least one protected data protected by the protection mechanism is stored at a storage address belonging to at least one third address range, and the detecting the new request to extract the protected data comprises comparing an address of the protected data and the at least one third address range.

16. The method according to claim 1, wherein the system is a microcontroller, the first group of instructions comprises boot instructions, and the second group of instructions comprises instructions of an application program.

17. A system comprising:
a processing unit;
a memory configured to store at least one first group of instructions and one second group of instructions executable by the processing unit, wherein the processing unit is configured to sequentially extract, from the memory, instructions of the first group and instructions of the second group for execution; and
a controller comprising:
a first auxiliary memory configured to store a protection criterion;
a comparator configured to compare a storage address of each extracted instruction with the protection criterion; and
a control circuit configured to, in response to the storage address meeting the protection criterion, trigger a protection mechanism including at least one prohibition for the processing unit to execute again at least one portion of the instructions of the first group, during the execution of the instructions of the second group.

18. The system according to claim 17, further comprising a communication bus and at least one master equipment connected on the bus, wherein the protection mechanism further includes a prohibition for the at least one master equipment to access at least one portion of the instructions of the first group, during the execution of the instructions of the second group.

19. The system according to claim 17, wherein the protection criterion is an address of a first instruction of the second group of instructions or an address of a last instruction of the first group of instructions, and a protected instruction meets the protection criterion when its address is the address of the first instruction of the second group of instructions or the address of the last instruction of the first group of instructions, respectively.

20. The system according to claim 18, wherein the protection criterion comprises a first address range and a protected instruction meets the protection criterion when its address is outside of the first address range.

21. The system according to claim 20, wherein the first address range is an address range of the instructions of the first group.

22. The system according to claim 20, wherein the control circuit is configured to at least prohibit the processing unit from executing again all of the instructions of the first group or to at least prohibit the at least one master equipment from accessing all of the instructions of the first group, during the execution of the instructions of the second group, during the execution of the instructions of the second group.

23. The system according to claim 18, wherein, in order to prohibit the execution again by the processing unit of a protected instruction of the portion or the access by the at least one master equipment to the protected instruction of the portion, the control circuit is configured to:
detect a new request to extract the protected instruction from the memory issued by the processing unit or the at least one master equipment; and
perform an action preventing the new request to extract the protected instruction from being served.

24. The system according to claim 23, wherein the control circuit is configured to perform the action by resetting the system.

25. The system according to claim 23, wherein the control circuit is configured to perform the action by delivering to the processing unit or to the at least one master equipment, a reference instruction instead of the protected instruction.

26. The system according to claim 23, wherein the at least one portion of the instructions of the first group protected by the protection mechanism is stored at storage addresses belonging to at least one second address range, the control circuit comprises a second auxiliary memory configured to store the at least one second address range, and the control circuit is configured to detect the new request to extract the protected instruction by comparing an address of the protected instruction with the at least one second address range.

27. The system according to claim 26, wherein the protection mechanism further includes a prohibition for the processing unit or the at least one master equipment to access, during the execution of the second group of instructions, at least one protected data stored in the memory.

28. The system according to claim 27, wherein the prohibition to access comprises the control circuit configured to:
detect a new request to extract the protected data from the memory issued by the processing unit or the at least one master equipment; and
perform an action preventing the new request to extract the protected data from being served.

29. The system according to claim 28, wherein the control circuit is configured to perform the action by resetting the system.

30. The system according to claim 28, wherein the control circuit is configured to perform the action by delivering, to the processing unit or to the at least one master equipment, a reference data instead of the protected data.

31. The system according to claim 27, wherein the at least one protected data protected by the protection mechanism is stored at a storage address belonging to at least one third address range, the control circuit comprises a third auxiliary memory configured to store the at least one third address range, and the control circuit is configured to detect a new request to extract the protected data by comparing an address of the protected data with the at least one third address range.

32. The system according to claim 31, wherein the protection criterion and the second and third address ranges are stored in a protected manner.

33. The system according to claim 17, wherein the system is a microcontroller, the first group of instructions comprises boot instructions, and the second group of instructions comprises instructions of an application program.

34. A non-transitory computer-readable media storing computer instructions for protecting a system, the system comprising a processing unit and a memory storing at least one first group of instructions and one second group of instructions executable by the processing unit, the instructions, when executed by the processing unit, cause the processing unit to:
sequentially extract the instructions of the first group and the instructions of the second group for execution from the memory;
compare a storage address of each extracted instruction with a protection criterion; and in response to the compared storage address meeting the protection criterion, trigger a protection mechanism including at least one prohibition for the processing unit to execute again at least one portion of the instructions of the first group, during the execution of the instructions of the second group.

* * * * *